E. E. BERGREN.
VEGETABLE LOADER.
APPLICATION FILED AUG. 17, 1908.
946,321.
Patented Jan. 11, 1910.
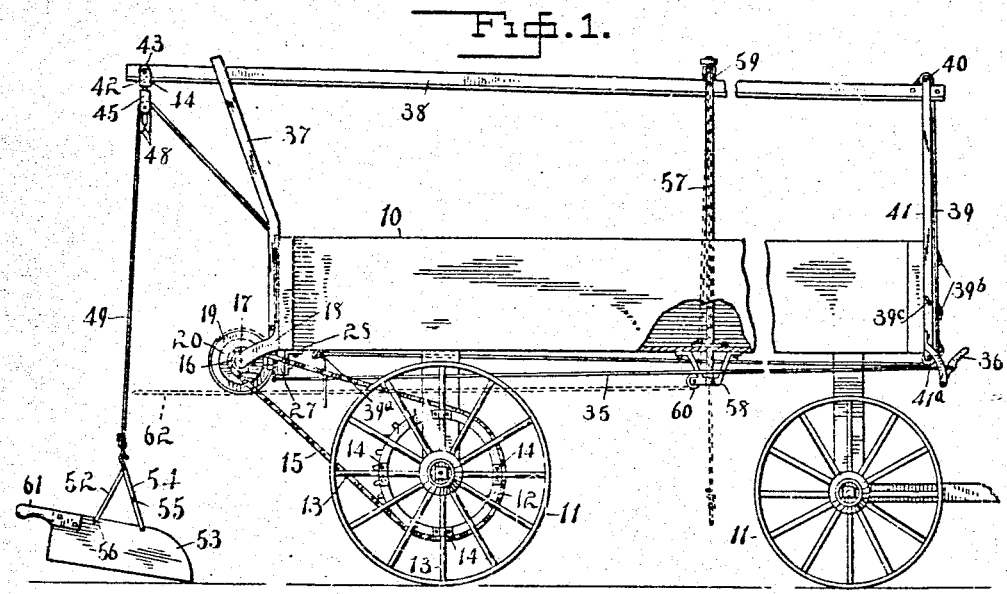
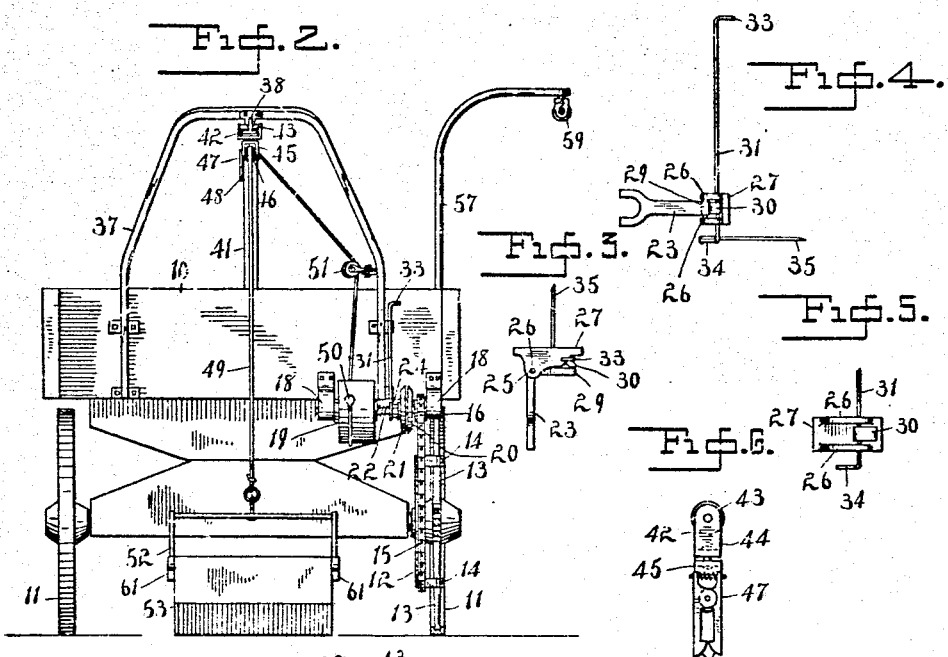
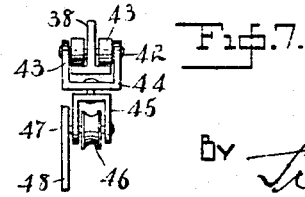
WITNESSES:
Mathew J. Marty
C. F. Bassett
INVENTOR
Erick E. Bergren
BY Frederick Benjamin
ATT'Y.

UNITED STATES PATENT OFFICE.

ERICK E. BERGREN, OF AURORA, NEBRASKA.

VEGETABLE-LOADER.

946,321.  Specification of Letters Patent.  Patented Jan. 11, 1910.

Application filed August 17, 1908. Serial No. 448,774.

*To all whom it may concern:*

Be it known that I, ERICK E. BERGREN, citizen of the United States, residing at Aurora, in the county of Hamilton and State of Nebraska, have invented certain new and useful Improvements in Vegetable-Loaders, of which the following is a specification.

My invention relates to loading apparatus, and has particular reference to devices applicable to the handling of vegetables in the field either from piles or rows.

The appliance is especially useful in loading beets into an ordinary wagon, and the chief objects of the improvements forming the subject matter of this application are:—
To expedite the operation of harvesting all vegetables that can be handled by means of a scoop; to utilize the power of the traction animals attached to the wagon in elevating and conveying the scoop when filled or empty; and to produce an apparatus for loading that can be used either at the side or rear of the wagon.

Further objects of my invention are, to simplify the hoisting apparatus; to provide a mechanism that can be attached to an ordinary wagon, and to furnish an efficient appliance that can be manufactured economically.

I accomplish the objects sought by employing the apparatus illustrated in the accompanying drawing, which forms a part of this application, the mechanism, generally described, comprising a shaft attached to the bed of a wagon, a winding drum thereon, means for operating the drum from one of the wagon wheels, a clutch, a frame carried on the wagon and the necessary ropes and pulleys for operating a scoop which forms the gathering device.

I have illustrated the preferred form of the apparatus in the following views:—

Figure 1 is a side elevation of a vehicle designed for conveying beets equipped with my complete hoisting and conveying appliance; Fig. 2 is a rear view of the apparatus shown in Fig. 1; Figs. 3 and 4 are, respectively, a top plan and a side view of the clutch operating mechanism; Fig. 5 is a front elevation of the bracket plate supporting the clutch arms, with a portion of the operating shaft attached, and Figs. 6 and 7 are side and front views, respectively, of the trolley and attachments.

Referring to the details of the drawing, the numeral 10 indicates the bed of a wagon designed to be drawn by horses and 11 the wheels one of which is utilized as a driving wheel for the hoisting mechanism hereinafter described, power being derived therefrom, when the wagon is being drawn by the attached team, in the following manner. Upon the inner side of one of the hind wheels 11 is mounted a sprocket wheel 12, concentric with the axis of the wagon wheel, and secured to the spokes 13 by clips 14. A chain 15 connects the driving sprocket 12 with a driven sprocket wheel 16 of less diameter loosely mounted upon a shaft 17, journaled in hangers 18 attached to the rear of the wagon bed 10. The said shaft 17 carries a drum 19 fixed thereon, and a friction clutch comprising a pair of disks, one of the disks 20 being attached to the driven sprocket 16, and the coöperating disk 21 splined upon the shaft 17, and held normally against the disk 20 by a suitable coiled spring 22, surrounding the shaft 17 between the drum and the said disk. The spring 22 is sufficiently powerful to maintain the disks in apposition and cause the shaft 17 and drum 19 to revolve when the wagon moves and to perform the work required by the means and in the manner hereinafter described. It is necessary however, to stop the shaft a portion of the time while the wagon is moving, and this is accomplished by means of a forked shaped lever or arm 23 which engages a grooved hub 24 made fast to the slidable disk 21. The lever 23 is hinged on a pintle 25 supported upon ears 26, attached to a bracket plate 27 secured to the bed 10 by a bracket 28. The short arm 29 of the lever is acted upon by a lug or arm 30 attached to a vertical rock shaft or rod 31 journaled in supports 26 and provided with an operating handle 33 by means of which the said rod can be turned until the arm 30 striking the lever arm 29 releases the clutch by sliding the disk 21 away from its companion. As it is very desirable that the driver should have this clutch under control especially when loading from the side, the vertical rod or rock shaft 31 is provided at its lower end with an arm 34, to which is attached a long rod or cable 35 leading beneath the bed 10 to a point beneath the driver's seat where it is attached to a foot lever or pedal 36.

To the rear end of the box or bed 6 is attached a bow frame 37 and hung from the frame is a T-shape bar or rail 38 placed in an inverted position. This rail lies in the medium line, having its rear end projecting beyond the wagon bed 10, and extending forward to the forward end of said bed, where it is supported by a rope or cable 39, passing over a pulley 40, secured to the upper end of an upright support 41. The rope is then carried around a pulley 41ª and led rearwardly beneath the bed 10, to some convenient point 39ª where it may be readily reached by the operator from the rear of the wagon. The said rope is furnished with loops 39ᵇ for attachment to a hook 39ᶜ at the front; these loops affording a convenient means of adjusting the rail 38 from the front end of the wagon.

A trolley 42 is adapted to travel upon the rail 38 for a purpose that will hereinafter appear. This trolley comprises a pair of wheels 43 arranged one upon each side of the web of the rail 38 and running upon the lateral flanges. A drop frame 44 extends below the rail and upon this frame is swiveled a hanger 45 supporting a grooved pulley 46. Upon one end of the pulley axle is suspended a grasping tong or grapple 47, the jaws 48 being beveled to facilitate the entrance of the object to be seized thus making the device automatic in its action.

A hoisting rope 49 is removably secured at one end to the drum 19, by inserting its extremity into a key-hole slot 50 in the face of the drum, the end of the rope being knotted so that it will be retained in the narrow end of said slot but will readily pass through the larger part of the opening for insertion or removal. The free end of the said rope is then carried upward around a pulley 51 and thence to the pulley 46 over which it passes and is then brought down and attached in any convenient manner to the bail or draw-bar 52, of a receptacle or scoop 53, the latter being of any form suited to the particular kind of roots to be handled. I prefer to construct the bail or draw-bar 52 with a brace 54 at each side of the scoop, and provide the brace with a toggle joint 55. When the parts are in the relative positions shown in Fig. 1, the scoop will be supported evenly and the brace 54 will prevent the scoop from being dumped backward when there is an excess of weight in the rear portion. When loading the joint 55 is broken thus permitting the traction to take place in an inclined direction entirely from the point of attachment 56.

In order to make provision for loading from the side of the wagon, I provide a crane 57, curved so as to project a suitable distance beyond the bed 6. This crane passes down just inside the bed and through the bottom the lower end being stepped in a hanger 58 bolted to the under side of the bed. A pulley 59 is secured to the upper extremity of the crane, and another pulley 60 is mounted on the hanger 58. When using the crane the rope 49 is removed from its engagement with the pulleys 46 and 51 and carried over the pulleys 60 and 59 as shown in dotted outlines in Fig. 1, its rear end remaining attached to the drum.
The apparatus thus described may be used to especial advantage in three ways:—thus the loading may be done at the rear or at the side, in both cases deriving power from the running gear of the wagon, or by hitching a team directly to the rope. In loading from the rear the rope is arranged as shown in full lines in Fig. 1, and Fig. 2. This plan is especially useful when the roots to be loaded lie in rows or small heaps. The wagon is preferably driven directly over the row. The operator first breaks the joint of the brace 54, and then taking hold of the handles 61 of the scoop he fills the latter as the team advances, the driver in the meanwhile holding the clutch out of mesh by means of the foot lever 36. When the scoop is loaded the clutch is released and the drum 19 set in motion, hoisting the scoop and contents upward until the tongs 47 grapple the bail or bar 52. The forward end of the rail is then lowered sufficiently to allow the trolley and suspended scoop to roll, under the influence of gravity, to the point above the bed where it is desired to dump. When the scoop is emptied the rail is again elevated and the scoop returned to the rear disengaged from the tongs and lowered to the ground where it is ready for another load. When loading from the side the hoisting rope is removed from the pulleys 46 and 51 and carried beneath the wagon to the pulley 60 and thence over the pulley 59 at the top of the crane. The manipulation of the apparatus is practically the same until the scoop is elevated. It is then carried over the wagon bed by turning the crane in its socket, and after the scoop is dumped, the arm of the crane is returned to its initial position and the scoop lowered to the ground as before.

It will frequently be desirable to load while the wagon is at rest, especially when the material to be handled is disposed in piles. This may be done by detaching the end of the hoisting rope from the drum 19 and then taking a single turn of the rope about the drum carrying it back to a suitable distance in the rear, as indicated by the dotted lines 62, in Fig. 1, and attaching a team thereto to furnish the power for hoisting, thus acting upon the load to be raised without the employment of the gearing. It will be necessary, of course, to throw the clutch out of engagement while using this direct means for hoisting.

Having thus described my invention what I claim as new, is:—

1. In a loading apparatus, the combination with a wagon bed and wheels therefor, of a shaft, gearing connecting said shaft with one of said wheels, frames arranged at opposite ends of the body, a rail connecting said frames, a trolley on said rail, devices connected with said shaft for operating said trolley, and means for controlling said devices from either end of said body.

2. In a loading apparatus, the combination with a wagon bed and wheels therefor, of a shaft journaled in the bed, rope winding means on said shaft, gearing connecting said shaft with one of said wheels, a crane pivotally mounted on said bed, a pulley on said crane, a rope engaging said pulley and connected to said winding means, and means arranged to control the winding means from either end of the wagon.

3. In a loading apparatus, the combination with a wagon, of a shaft journaled on the wagon, operative connection between said shaft and one of said wheels, a scoop, means connected with the shaft for elevating the scoop, and means for throwing said shaft into and out of gear with said wheel.

4. In a loading apparatus, the combination with a wagon, a shaft journaled thereon, and operative connection between the shaft and one of the wheels of the wagon, of a clutch on the shaft, a drum on the shaft, a frame attached to the wagon, a trolley arranged on the frame, a rope attached to said drum and engaging said trolley, and means for operating said clutch from either end of said wagon.

5. In a loading apparatus, the combination with a wagon, a shaft journaled thereon, and operative connection between the shaft and one of the wheels of the wagon, of a clutch on the shaft, means for operating said clutch, a drum on the shaft, a frame arranged on the wagon, trolley traveling on the frame, a rope removably attached to said drum, and engaging the trolley and a scoop removably attached to said rope.

6. In a loading apparatus, the combination with a wagon, a shaft in the wagon, operative connection between the shaft and one of the wheels of the wagon, a clutch on the shaft, a winding drum, and a scoop, of means connected with the drum for elevating said scoop, and means for shifting the scoop to a position above the bed of the wagon when elevated.

7. In a loading apparatus, the combination with a wagon bed and wheels therefor, a rope winding device, operative connection between the said winding device and one of said wheels, a crane pivoted on said bed, a pulley on said crane, a rope engaging said pulley and having one end attached to said winding device, a scoop adapted to be attached to said rope, and means adapted to control the winding device, said means being arranged to be operable from both ends of the wagon bed.

In testimony whereof I affix my signature in the presence of two witnesses.

ERICK E. BERGREN.

Witnesses:
AXEL E. AXEN,
D. I. MAGNUSON.